United States Patent [19]

Deeg

[11] 4,149,868

[45] Apr. 17, 1979

[54] PROCESS FOR PRODUCING OPTHALMIC LENSES WITH GRADATED PHOTOCHROMIC BEHAVIOR

[75] Inventor: Emil W. Deeg, Woodstock, Conn.

[73] Assignee: American Optical Corporation, Southbridge, Mass.

[21] Appl. No.: 880,839

[22] Filed: Feb. 24, 1978

[51] Int. Cl.² .................... C03C 15/00; C03B 31/00
[52] U.S. Cl. ........................ 65/30 R; 65/33; 65/111; 65/115; 65/119; 65/DIG. 2; 106/52; 106/DIG. 6
[58] Field of Search ............ 65/30 R, 17, DIG. 2, 65/33, 111, 115, 119; 106/DIG. 6, 52

[56] References Cited

U.S. PATENT DOCUMENTS

| | | | |
|---|---|---|---|
| 2,984,943 | 5/1961 | White | 65/107 |
| 4,072,490 | 2/1978 | Illig | 65/30 R |

*Primary Examiner*—S. Leon Bashore
*Assistant Examiner*—Frank W. Miga
*Attorney, Agent, or Firm*—Jeremiah J. Duggan; Howard R. Berkenstock, Jr.

[57] ABSTRACT

A method of treating ophthalmic quality lenses or lens blanks that produces a reversible progressive local variation in phototropic behavior with a continuous variation in transmissivity. The lens or lens blank is composed of a potentially phototropic glass containing all the necessary ingredients including uniformly dispersed silver halide particles therein to develop a phototropic behavior during the heat treatment of the present method. The steps of the present method include mounting the lens or lens blank in carrier means, heating the lens or lens blank thus mounted in a heat treatment furnace at a temperature sufficient to develop the phototropic behavior of the potentially phototropic glass. Characteristically the required heat treatment temperature to develop this phototropic behavior is one which exceeds the strain point of the glass but not the softening point thereof. The heat treatment includes the further step of maintaining selected portions of the lens or lens blank at a temperature to substantially inhibit the development of the phototropic behavior and thus produce a progressive gradient of transmissivity. The particular improvement of the present invention includes heat sinking the selected portion of the lens to be maintained at a temperature which substantially inhibits the development of phototropic behavior by utilizing the latent heat of transformation of a material which has at least one phase transformation temperature below the temperature required for development of phototropic behavior. This heat sinking is accomplished by positioning the heat sinking material proximate to the portion of the lens or lens blank in which the temperature is to be maintained to substantially inhibit the development of phototropic behavior. This is preferably accomplished by establishing a path of heat conduction between the heat sinking material and the selected portion of the lens or lens blank.

4 Claims, 12 Drawing Figures

PROCESS FOR PRODUCING OPTHALMIC LENSES WITH GRADATED PHOTOCHROMIC BEHAVIOR

FIELD OF THE INVENTION

This invention relates to phototropic ophthalmic lenses which have been treated so as to produce a reversible progressive local variation in the phototropic behavior exhibiting a continuous variation of transmissivity.

This invention is in the field of gradient photochromic or phototropic lenses as is discussed in some detail in other applications assigned to the Assignee of the present application. These include application Ser. No. 624,688, filed Oct. 22, 1975 which is directed to a gradient photochromic lens and to a Division thereof application no. 668,175, filed Mar. 18, 1976 and now U.S. Pat. No. 4,036,624. These two applications discuss the field of photochromic lenses and glasses in great detail and should be referred to for an understanding of such. Accordingly these applications are incorporated by reference in the present application.

Likewise of interest are other applications also assigned to the Assignee of the present application which are directed to methods of, and apparatus for the production of gradient photochromic lenses which are as follows: Ser. No. 789,585 filed Apr. 21, 1977, now U.S. Pat. No. 4,101,302 issued July 18, 1978; Ser. No. 785,492 filed Apr. 7, 1977; Ser. No. 668,172 filed Mar. 18, 1976, now patent 4,076,395; Ser. No. 668,173 filed Mar. 18, 1976, now U.S. Pat. No. 4,080,051 issued Mar. 21, 1978; Ser. No. 657,006 filed Feb. 10, 1976; Ser. No. 849,274 filed Nov. 7, 1977; Ser. No. 849,275 filed Nov. 7, 1977; Ser. No. 678,583 filed Apr. 20, 1976; and Ser. No. 814,503 filed July 11, 1977.

It should be pointed out that glass articles including ophthalmic lenses and lens blanks exhibiting a reversible continuous phototropic behavior are known and method of making them has been described such as in U.S. Pat. No. 4,036,624 referred to above. Likewise Canadian Pat. No. 739,404 describes a method for producing a glass plate having a phototropic portion and a nonphototropic portion. The method disclosed therein includes forming a plate from a potentially phototropic or photochromic glass melt and subjecting the glass plate to a heat treatment in a partitioned lehr. Alternatively the Canadian reference teaches the differential heat treatment that may be carried out by having the plate being partially insulated by encasing a portion of the plate in a refractory block. The reference teaches that the product produced by the method has a sharp transition from the phototropic portion to the non phototropic portion. It is this characteristic which is to be avoided in the practice of the present invention.

U.S. Pat. No. 4,036,624 teaches the production of the gradient phototropic lens or lens blank in a specially designed heat treatment furnace. This furnace is characterized by its ability to maintain a temperature gradient within the area used for heat treating the potentially phototropic or photochromic lens or lens blank.

In the applications listed by serial number above, the production of gradient phototropic lens and lens blanks are taught using a conventional furnace for the heat treatment of glass articles where the gradient is produced by virtue of apparatus used to mask a portion of the potentially photochromic lens or lens blank from the heat treatment effect of the furnace.

In all of these disclosures the portion of the potentially phototropic glass article which is exposed to the temperature required to develop phototropism grows the expected photochromic properties whereas the portion of the article held at a temperature below the minimum temperature required to develop such phototropism and maintains a non-phototropic behavior. All of these disclosures referred to so far teach the establishing temperature gradient required to develop in the potentially phototropic glass article a gradient phototropic behavior by having a higher heat flux entering their portion of the article where the phototropic behavior desired and a lower heat flux in the portion of the article where the non-phototropic behavior is to be maintained through a shielding of the article or a gradient furnace.

An alternative way of producing a gradient photochromic lens utilizes a somewhat different approach in so far as the potential phototropic lens or lens blank is exposed to a uniform heat flux provided by a conventional gas or electrically fired lehr or muffle furnace. To obtain the required temperature gradient inside the lens or lens blank, a portion of the lens or lens blank is cooled by a vapor passing by a portion of the lens or lens blank and the vapor is produced in a porous refractory. The disclosure teaches that the vapor produced in a porous refractory carrier which is proximate to the lens blank such that the vapor flow will maintain a portion of the lens blank at a temperature below that required for the development of phototropic behavior. This particular approach to the manufacture of gradient photochromic or phototropic articles utilizes individual lens fixtures inside of which a vapor releasing pourous refractory material is disposed. This procedure permits heat treatment as required to achieve a gradated phototropism in the individual lens or lens blank. According to the disclosure, care must be exercised however, to direct the flow of vapor in a defined manner to obtain the optimal heat transfer from the portion of the lens to be kept at the lower temperature by the vapor.

The method of the present invention provides for individualized heat treatment of lenses in conventional lehrs or muffle furnaces by an alternative to vapor cooling. By the present invention the required differential heat flux to and from lens or lens blank is accomplished by precisely controllable heat conduction promoted in material parts of the fixture holding the lens or lens blank during the heat treatment procedure. To achieve this required conduction, the lens or lens blank fixture is equipped with heat sink means such as a material of a relatively high latent heat of transformation and/or fusion and/or evaporation. This heat sink means is disposed in relation to the fixture in good thermal contact with that portion of the lens or lens blank to be treated. An important limitation on the heat sink material chosen is that the transformation and/or melting and/or boiling temperatures of the material are not above the minimum temperature required to develop the phototropism in the potentially phototropic lens or lens blank.

This present invention represents an important improvement in the method of manufacturing gradated photochromic phototropic products over the processes described in the above applications and U.S. Pat. No. 4,036,624. The present invention also does not require heat treatment in a partioned lehr or partial insulation of the potentially photochromic article as described in Canadian Patent 739,404 or the particular drawing methods described in German Pat. DBP No. 2125232 which deals exclusively with continuously drawn sheet glass. Further details of the present invention become readily apparent from the following description of the preferred embodiment.

SUMMARY OF THE INVENTION

A method of treating ophthalmic quality lenses or lens blanks that produces a reversible progressive local variation in phototropic behavior with a continuous variation in transmissivity. The lens or lens blank is composed of a potentially phototropic glass containing all the necessary ingredients including uniformly dispersed silver halide particles therein to develop a phototropic behavior during the heat treatment of the present invention. The steps of the present method include mounting the lens or lens blank in carrier means, heating the lens or lens blank thus mounted in a heat treatment furnace at a temperature sufficient to develop the phototropic behavior of the potentially phototropic glass. Characteristically the required heat treatment temperature to develop this phototropic behavior is one which exceeds the strain point of the glass but not the softening point thereof. During the heat treatment the further step of maintaining selected portions of the lens or lens blank at a temperature low enough to substantially inhibit the development of the phototropic behavior and thus produce a progressive gradient of transmissivity. The particular improvement of the present invention includes heat sinking the selected portion of the lens to be maintained at a temperature which substantially inhibits the development of phototropic behavior by utilizing the latent heat of transformation of a material which has at least one phase transformation temperature below the temperature required for development of phototropic behavior. This heat sinking is accomplished by positioning the heat sinking material proximate to the portion of the lens or lens blank in which the temperature is to be maintained to substantially inhibit the heat sinking material and the select portion of the lens or lens blank.

Practice of the method is enhanced by the use of mounting fixtures according to the following disclosure.

A full understanding of the scope of the invention may be had by reference to the subsequent Description and Drawings accompanying it.

DESCRIPTION OF THE DRAWINGS

FIGS. 6b and 6c are sectional views of the apparatus of FIG. 6a.

FIGS. 7b and 7c are sectional views of the apparatus of FIG. 7a.

DESCRIPTION OF PREFERRED EMBODIMENTS

Figure 1:
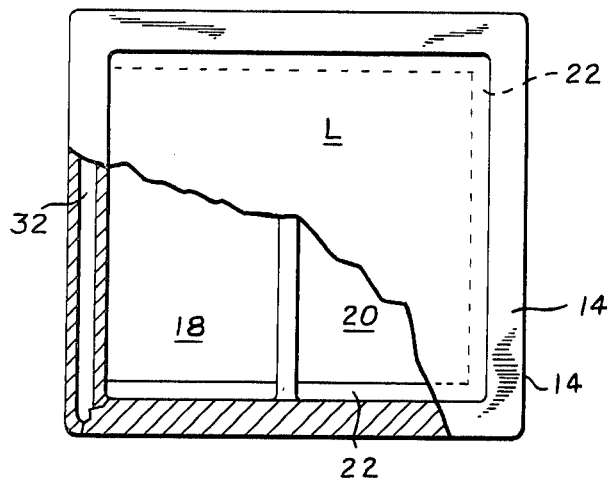
FIG. 1 is a top view, partially in section, of apparatus for carrying out the method of the present invention.
Figure 2:
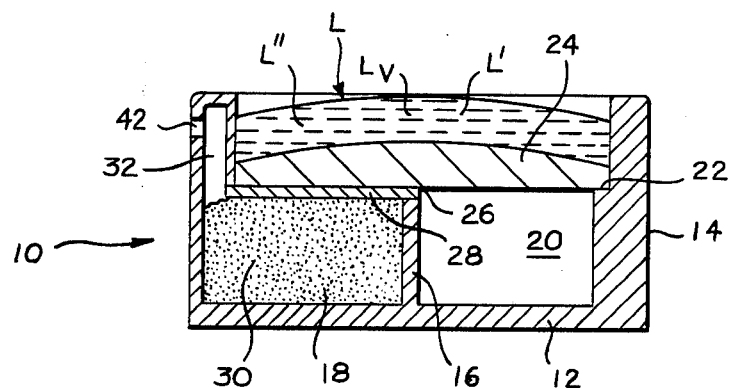
FIG. 2 is a side sectional view of the apparatus of FIG. 1.

Referring now to the Figures and in particular the FIGS. 1 and 2, reference number 10 indicates a fixture useful in practicing the method of heat treating ophthalmic lenses or lens blanks according to the present invention. Fixture 10 includes a base portion 12 having sidewalls 14 extending generally upwardly from the base portion and divider means 16 which is disposed generally centrally of the area enclosed by sidewalls 14. Divider means is adapted to run between two of the sidewalls so as to divide the fixture into separate portions. In the present instance these two portions 18 and 20 are of relatively equal proportion for reasons to be discussed subsequently.

Sidewalls 14 are adapted with mounting means 22 such as the flange illustrated. Disposed on mounting means 22 are support means 24 for receiving thereon ophthalmic lens blank or lens L.

Support means 24 is preferably disposed on mounting means 22 such that the support means generally closes portions 18 and 20 by coming into close contact with divider means 16. As indicated at 26 in the preferred embodiment illustrated, portion 18 is additionally enclosed by cover 28 which is disposed in contact with divider means 16 and mounting means 22. Disposed within portion 18 is heat sinking material 30 which is selected from a group of materials subsequently described in greater detail. The selected materials exhibit one or more phase transitions within a prescribed temperature range which extends up to the minimum temperature required to develop photochromic or phototropic properties in lens or lens blank L. The heat sinking material selected for this group of materials also exhibits a relatively high enthalpy of phase transition at the phase transition temperature. The basis of these selections will be discussed subsequently in greater detail.

Fixture 10 may additionally include an expansion cavity 32 which in the present embodiment is illustrated as being contained in sidewall 14. Since most materials which may be chosen as heat sinking means 30 exhibit also the characteristic of expansion during heating, it is preferable to provide such expansion means 32 to accommodate whatever increase in volume may occur in the material 32 during the heating and phase transition. If during a phase transition vapor is emitted by the heat sink material it may escape through vent holes 42.

Figure 3:
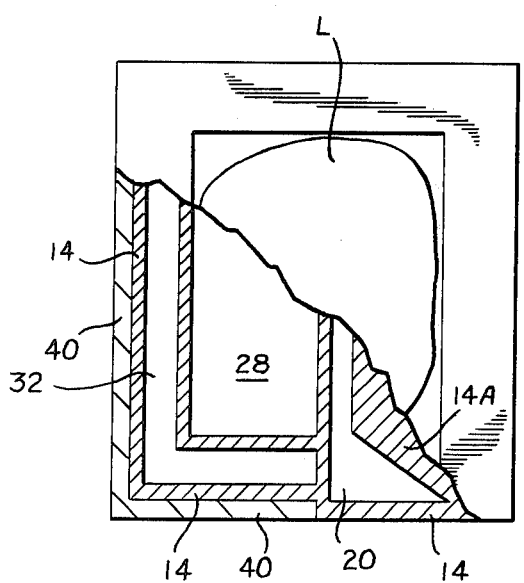
FIG. 3 is a top view, partially in section, of an alternative apparatus to that of FIG. 1 and to use in practicing the invention.
Figure 4:
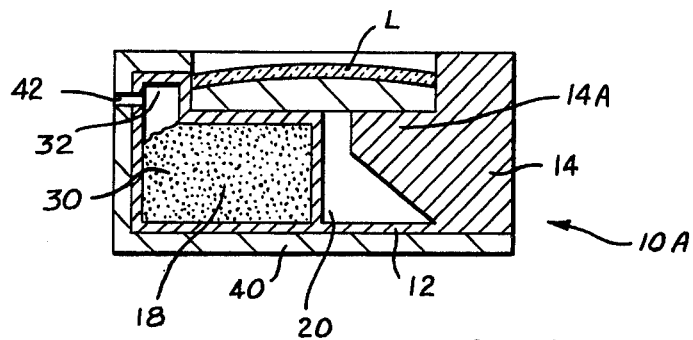
FIG. 4 is a sectional side view of the apparatus of FIG. 3.

Referring now to FIGS. 3 and 4, an alternative embodiment of fixture 10 is illustrated. Several of the structural portions of the fixture illustrated in FIGS. 3 and 4 correspond similarly to structure elements of the fixture of the FIGS. 1 and 2. In those instances the reference numerals of FIGS. 1 and 2 are carried through FIGS. 3 and 4. It will be noted however that one of the sidewalls 14 is adapted to include a projection 14A extending within the cavity portion 20 of the fixture in the embodiment illustrated in cross section. This projection 14A in the illustrated embodiment is an extension of flange 22 projecting outwardly from the side wall in a generally trapezoidal cross section as viewed from the top. It preferably contacts support means 24 over the full extent of projection 14A.

The purpose of cross projection 14A is to promote more uniform temperature distribution in a vertical direction in lens L such that the selected lens portion L' to become phototropic is more uniformly exposed to the heat treatment for the development of such properties.

An additional modification of fixture 10A is the inclusion of insulating material 40 on base portion 12 and sidewalls 14 which generally surround the cavity portion 18. Traditional insulation materials such as asbestos or that known by the tradename Fiberfrax or other porous ceramic bodies may be employed as the insulation. In the illustrated embodiment an insulating thickness of about 5 to 10 mm is sufficient for the bottom and side walls. Insulation 40 extends preferably over the full extent of the base portion 12 and the full extent of the sidewalls surrounding cavity portion 18. Preferably insulation 40 does not extend to sidewalls 14 which surround cavity portion 20.

The purpose of these adaptations of fixture 10A are to promote the concentration of the heat flux of either the heat sink material or the furnace to the appropriate portions of lens or lens blank L. Appropriately concentrating the heat flux for the relative areas may reduce the necessary cycle time for developing the phototropic properties in the selective portion of the lens L. Additionally concentration of the heat flux in the appropriate support areas for the selective portion of the lens L, which is to become phototropic promotes a more uniform development of phototropic properties therein.

As previously observed, a variety of competing heat transfer components are being concentrated in lens L during the treatment process. On one hand the portion selected for development of phototropic properties (L') must quickly and uniformly be brought to the acceptable range of temperatures for such development. Overheating results in haziness being introduced into the lens. Non-uniform heating results in irregular phototropic capability development. Underheating results in lack of development of the desired degree of phototropic behavior. In this discussion "overheating" and underheating are relative terms which also imply a time factor, since development of the phototropic properties is a function of both time and temperature as may be observed from reference to the prior art discussed above as well as in reference to FIG. 5.

Competing with the development of phototropic behavior in lens portion L' is the lack of development to be observed in lens portion L". As explained above, portion L" is to remain undeveloped as to phototropic capabilities, so the heat treatment imposed on L' must be denied to L". So long as the temperature in lens L at L" does not reach the threshold temperature for development of phototropic properties in potentially phototropic glass, then this function of the fixture has been accomplished. The requirement in this selected portion is an absolute one, so the problem of uniformity is not faced. This is not to imply however that uniformity of heat treatment history is not important in the portion L" of the lens. There exists between the lens portions L' and L" a transition zone $L_v$ where the phototropic properties go progressively from undeveloped to fully developed, wherein the characteristic of progressive local variations in phototropic behavior with a continuous variation in transmissivity occurs.

In this area of progressive local variation the problem of uniformity again exists. One method of achieving the desired uniformity (e.g. from side to side and front to back) of phototropic properties is to subject portions L' and L" to uniform treatment and allow the intermediate zone to develop an equilibrium between these prescribed uniformities.

The fixture of FIG. 3 and 4 is adapted to promote the individual uniformity of treatment of lens portions L' and L" and establishing a "free" zone in the lens for a local equilibrium to exist (e.g. front to back and side to side) over a zone of local variation of heat treatment and ultimately development of phototropic properties.

Fixtures 10 and 10A are preferably fabricated out of a material which is resistant both to chemical attack by the heat sink material 30 as well as the environment of the heat treatment into which the fixture is placed. Suggested as acceptable materials are oxidation resistant metals such as stainless steel, types 309, 310, 316, and 317, and tool steel type Ajax SCC 66. Additional suggested materials may be beryllium nickel alloys as are frequently used in glass mold fabrication as well as Inconel type alloys. Conditionally also non-metallic materials such as graphite or ceramics which exhibit thermal conductivity useable in the art of heat treating glass parts may be satisfactory for certain applications.

Stainless tool steels are suggested as preferable because of availability and generally lower costs and general workability. It should be noted that the material of which fixtures 10 and 10A are fabricated should promote thermal conductivity since heat is desired to be transmitted from the furnace atmosphere into the portion of the lens L or fixture 10 for development of photochromic properties as well as the transfer away of heat from the lens L which is selected to not develop photochromic properties. With this in mind cover 28 may preferably be fabricated of the same material as the fixtures 10 and 10A. Support member 24 is preferably fabricated of a ceramic material such as described in U.S. Pat. No. 3,440,187 issued Apr. 20, 1948. The preferred material exhibits a thermal conductivity of approximately an order of magnitude or more below that of the materials suitable for fixture 10 and 10A. This differential of thermal conductivity for the selective material is chosen to limit the temperature equilibrium in a horizontal direction or specifically in the lens L from top to bottom (e.g. distance vision portion to reading portion) or vice versa, specifically between in that region where the photochromic properties are developed to the maximum and the region where the photochromic properties are developed to the minimum or, not at all. Support member 22 must, however, be of a thickness such that the thermal conductivity in the vertical direction namely between the lens L and the portions 18 and 20 of the fixture 10 and 10A is not impeded such as to destroy the uniformity of heat treatment in lens portion L' and the lack of heat treatment to lens portion L". Specifically, the thickness of support 22 must be such that an approximate temperature equilibrium occurs between heat sinking material 30 and lens portion L" as well as approximate thermal equilibrium between lens portion L' and cavity portion 20 or projection 14A. Thickness values may be readily determined for particular materials and lens sizes chosen, however, for the types of material above described the following dimensions are suggested in the following examples.

Table I below is a selection of suggested compositions of potentially photochromic glass useable in the present invention.

Table I

Compositions of potentially photochromic or phototropic Glasses

|  | A | B | C | D | E |
|---|---|---|---|---|---|
| $SiO_2$ | 53.0 | 21.4 | 58.8 | 57.3 | 0.0 |
| $Al_2O_3$ | 10.5 | 37.7 | 22.9 | 9.1 | 8.3 |
| $ZrO_2$ | 2.0 | 0.0 | 0.0 | 0.0 | 1.3 |
| $Li_2O$ | 2.1 | 0.0 | 4.5 | 0.0 | 0.0 |
| $BaO$ | 6.0 | 5.5 | 0.0 | 0.0 | 3.3 |
| $SrO$ | 0.2 | 0.0 | 0.0 | 0.0 | 0.0 |
| $Na_2O$ | 0.6 | 3.8 | 1.5 | 6.5 | 16.2 |
| $NaF$ | 1.0 | 1.0 | 4.7 | 3.1 | 0.0 |
| $NaCl$ | 1.0 | 1.0 | 1.8 | 2.6 | 1.0 |
| $Ag_2O$ | 0.4 | 0.5 | 0.4 | 0.5 | 0.6 |
| $PbO$ | 5.1 | 0.0 | 0.0 | 1.0 | 0.0 |
| $CuO$ | 0.1 | 0.1 | 0.02 | 0.02 | 0.02 |
| $P_2O_5$ | 0.0 | 15.6 | 0.0 | 0.0 | 7.5 |
| $B_2O_3$ | 18.0 | 4.8 | 2.5 | 18.6 | 61.8 |
| $K_2O$ | 0.0 | 8.6 | 0.0 | 0.0 | 0.0 |
| $NaBr$ | 0.0 | 0.0 | 0.8 | 1.3 | 0.0 |
| $MgO$ | 0.0 | 0.0 | 2.1 | 0.0 | 0.0 |

Table II below is a selection of suggested compounds useable as the heat sink material exhibiting a change of phase transition in the appropriate temperature range. In the Table, T is temperature expressed in degrees centigrade, H is latent heat of transformation, expressed in kilo-joules per mole, C is specific heat expressed in joules per mole per degree centigrade, M is molecular weight, is specific gravity express in grams per cubic centimeter, Q is the approximate energy per unit volume absorbed by the heat sink material in the temperature range from 25° C. to 520° C. expressed in kilojoules per cubic centimeter and F is a figure of merit expressed in joules per cubic centimeter per degree C.

TABLE II

EXAMPLE OF ACTIVE HEAT SINK MATERIALS

| Substance | M | C | $T_1$ | H | $T_2$ | $H_2$ | | | $T_3$ | $H_3$ | $T_4$ | Q | F |
|---|---|---|---|---|---|---|---|---|---|---|---|---|---|
| $H_2O$ | 18.0 | 1.00 | 75.2 | 100 | 40.7 | — | | | — | — | — | 4.6 | 46.0 |
| $Na_2SO_4\ 10\ H_2O$ | 322.2 | 1.46 | 575.2 | 32 | 69.0 | see | $H_2O$ | and | $Na_2SO_4$ | | | 2.2 | 9.1 |
| NaOH | 40.0 | 2.13 | 59.5 | 239 | 6.4 | 319 | 6.4 | | 1390 | — | — | 2.5 | 7.8 |
| Sn | 118.7 | 7.29 | 26.4 | 13 | 2.1 | 232 | 7.1 | | 2690 | — | — | 1.5 | 6.5 |
| $Na_2SO_4$ | 142.0 | 2.70 | 127.7 | 177 | 3.1 | 241 | 7.0 | | 884 | — | — | 1.5 | 6.2 |
| Zn | 65.4 | 7.13 | 25.4 | 420 | 7.3 | 907 | — | | — | — | — | 2.3 | 5.5 |
| Se | 78.9 | 4.79 | 25.4 | 217 | 5.4 | 685 | — | | — | — | — | 1.2 | 5.5 |
| Cd | 112.4 | 8.64 | 26.0 | 321 | 6.4 | 765 | — | | — | — | — | 1.6 | 5.0 |
| $K\ Re\ O_4$ | 289.3 | 4.89 | 122.6 | 555 | 85.3 | — | — | | — | — | — | 2.6 | 4.7 |
| Bi | 209.0 | 9.79 | 25.6 | 271 | 10.9 | 1560 | — | | — | — | — | 1.2 | 4.4 |
| $ZnCl_2$ | 136.3 | 2.91 | 76.5 | 318 | 23.0 | 721 | — | | — | — | — | 1.4 | 4.4 |
| $K_2Cr_2O_7$ | 294.2 | 2.69 | 220.0 | 242 | ? | 398 | 37 | | — | — | — | 1.5 | 73.8 |
| AgCl | 143.3 | 5.56 | 55.8 | 455 | 12.7 | 1547 | — | | — | — | — | 1.7 | 3.7 |
| Te | 127.6 | 6.25 | 25.6 | 450 | 17.5 | 990 | — | | — | — | — | 1.6 | 3.6 |
| Tl | 204.4 | 11.85 | 26.4 | 234 | 0.3 | 304 | 4.2 | | 1457 | — | — | 1.1 | 3.6 |
| $CdCl_2$ | 183.3 | 4.05 | 76.6 | 564 | 48.6 | 960 | — | | — | — | — | 2.0 | 3.5 |
| Pb | 207.2 | 11.34 | 26.8 | 327 | 4.8 | 1751 | — | | — | — | — | 1.1 | 3.4 |
| $BrO_3$ | 69.6 | 1.84 | 63.0 | 450 | 23.0 | 2247 | — | | — | — | — | 1.5 | 3.3 |
| CuBr | 143.5 | 4.72 | 54.7 | 380 | 5.9 | 465 | 2.9 | | 488 | 9.6 | 1318 | 1.6 | 3.3 |
| AgBr | 187.8 | 6.47 | 52.4 | 259 | ? | 430 | 9.2 | | 1533 | — | — | 1.3 | 3.0 |
| $Ca(NO_3)_2$ | 164.1 | 2.47 | 149.2 | 561 | 21.3 | — | — | | — | — | — | 1.6 | 2.8 |
| $PbBr_2$ | 367.0 | 6.67 | 80.1 | 488 | 18.5 | 892 | — | | — | — | — | 1.2 | 2.5 |
| $PbCl_2$ | 278.1 | 5.85 | 77.8 | 498 | 23.6 | 951 | — | | — | — | — | 1.4 | 2.8 |
| Li | 133.8 | 4.06 | 54.4 | 449 | 5.9 | 1170 | — | | — | — | — | 1.1 | 2.4 |
| Cd 2 | 366.2 | 5.67 | 77.5 | 387 | 15.3 | 742 | — | | — | — | — | 0.9 | 2.3 |
| Pb 2 | 461.0 | 6.06 | 81.2 | 412 | 25.1 | 872 | — | | — | — | — | 0.9 | 2.2 |

Preferred examples of materials and quantities necessary in practicing the method of heat sinking a lens or lens blank below the temperature of development of the photochromic properties are listed below.

The potentially photochromic glass used in these examples is of the composition A listed in table I.

The expression "testing" as applied to the glass pressing after completion of the heat treatment described in the specific examples includes inspection for glass defects such as bubbles, stones, striae, cracks, chips and stress birefringence; examination for excessive haziness; determination of the transition zone from photochromic to non-photochromic behavior and marking this zone by applying two small dots of no more than 1 mm diameter of blue lacquer at the points of intersection of the boarder of the photochromic zone with the edge of the glass pressing. The photochromic zone may be determined by exposing each blank for 10 min. at a temperature of approximately 25° C. to UV light emitted by such as mercury gas discharge lamps of the type F 4T5—BL made by General Electric Co.

"Furnace temperature" is that obtained after the furnace is operated for approximately three hours with "dummy" glass pressings mounted on the fixtures passing through the furnace tunnel.

Figure 6A:
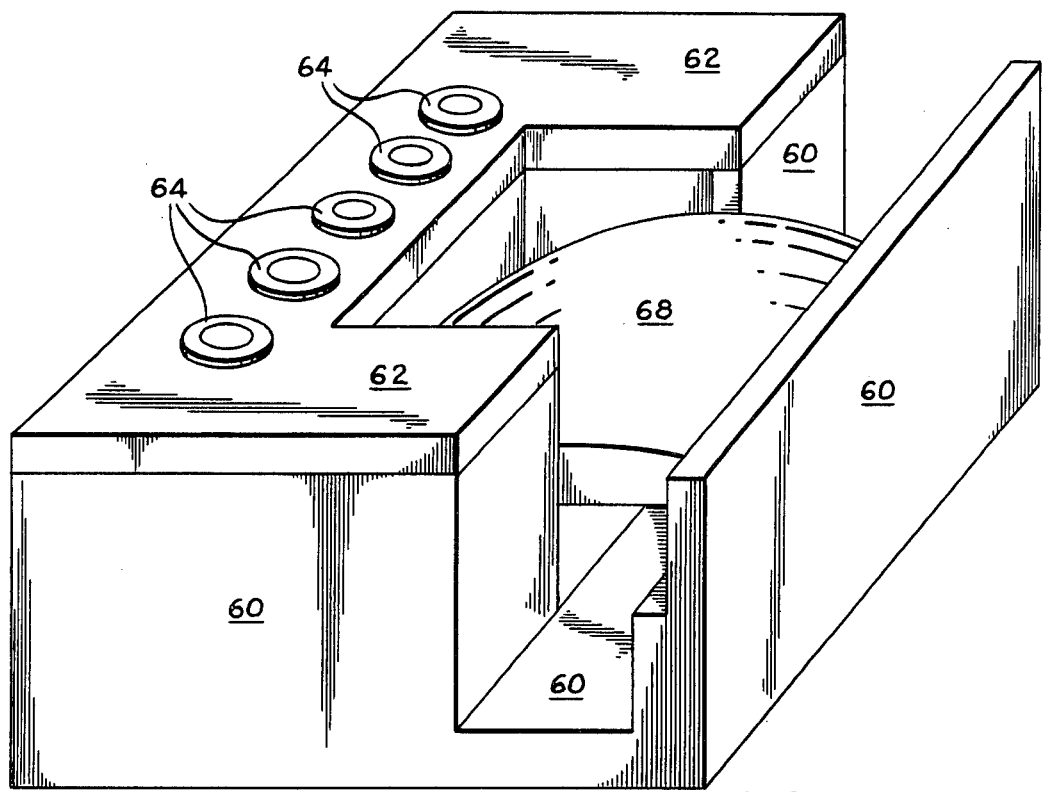
FIG. 6a is an isometric view of apparatus used in Example 1 of the invention.

FIG. 6a shows schematically a fixture used for preparing gradated photochromic lens blanks of rectangular shape. The suggested dimensions are in mm: height a=50, width, b=90, length, c=100, and height, d=40. This type of fixture consists of the main body 60, the lid 62 with five stainless steel rivets as securing means 64 and the lens support 30. The main body 60 comprises a ceramic structure made of the non-spall, light weight ceramic material Multiplex 45-5 available from the Chicago/Wellsville Fire Brick Co. which is illustrated in the detailed FIG. 6b and a welded insert 66 made of 317L type stainless steel of 1 mm wall thickness, said stainless steel container is placed loosely in a compartment of the ceramic body shown in FIG. 6b. The lid 62 may be a 5 mm thick liner sheet 65 of the same Multiplex ceramic to which a 2.5 mm thick sheet of 317L type stainless steel is fastened by means of the rivet securing means 64. These rivets serve also as ventilation holes by means of their hollow core of 5 mm inside diameter which is open on both ends. To avoid excessive thermal stress in the ceramic plate at elevated temperature due to the higher thermal expansion of the stainless steel plate a loose fit of the rivets at room temperature is provided for. The lens support 68 which will be referred to as "brown block" is a conventional bifocal fusion support made of a dense ceramic material as described in U.S. Pat. No. 2,440,187 issued to American Optical Company on Apr. 20, 1948. Support 68 has a thickness at its center of about 5–10 mm and tapers to its ends, having a convex curvature equal to the lens or lens blank it supports.

Figure 7A:
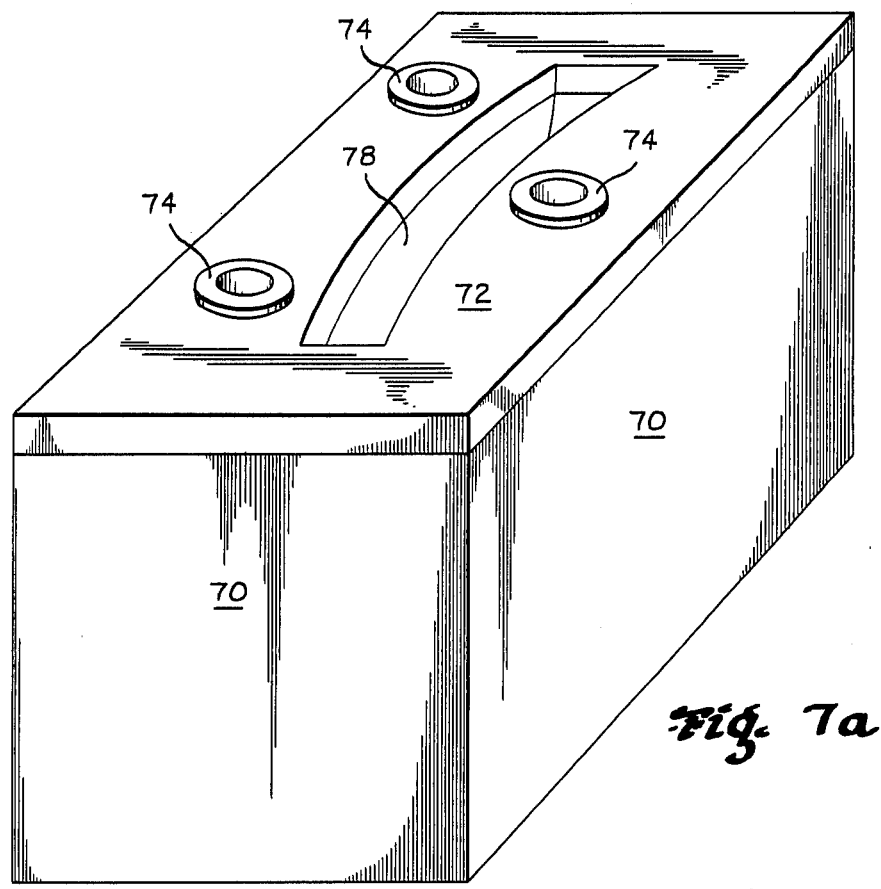
FIG. 7a is an isometric view of apparatus used in Example 3 of the invention.
Figure 7B:
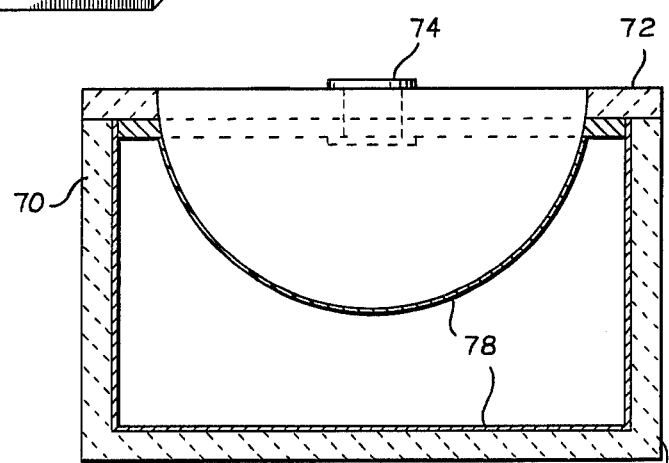
Figure 7C:
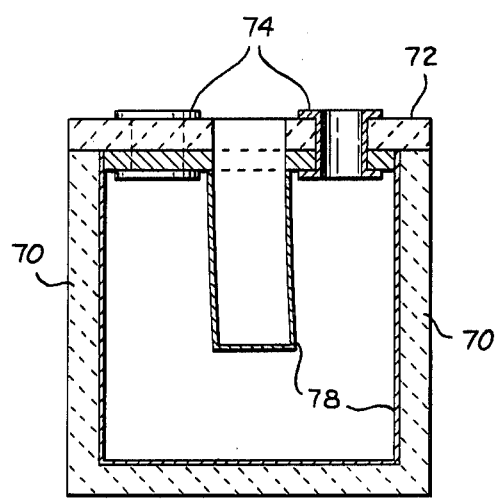

FIG. 7a shows schematically a fixture useful for preparing round gradated photochromic lens blanks. The dimensions suggested are, in mm: width, e=60, length f=100, and height, g=60. This fixture consists of a rectangular box 70 and a lid 72 with securing means such as three stainless steel rivets 74 and a stainless steel pocket 76. The rectangular box 70 is made of 5 mm thick Multiplex 45-5 previously referred to. Ceramic box 70 holds a welded insert 78 of 317L type stainless steel of 1 mm wall thickness. At room temperature of approximately 25° C. the steel container fits loosely into the ceramic box to allow for thermal expansion. The lid 72 consists of a 5 mm thick Multiplex 45-5 sheet to which a 2.5 mm thick liner sheet 73 of 317L type stainless steel is fastened by means of the rivets 74. Since rivets 74 are hollow, having an open core of about 10 mm inside diameter, these rivets serve also as ventilation holes and potential filling holes. To avoid excessive thermal stresses in the ceramic plate at elevated temperature, a loose fit of the rivets at room temperature is accomplished. The stainless steel insert 78 is further illustrated in FIGS. 7b and 7c and is welded to the 2.5 mm thick stainless steel plate of the lid.

EXAMPLE 1

Figure 6B:
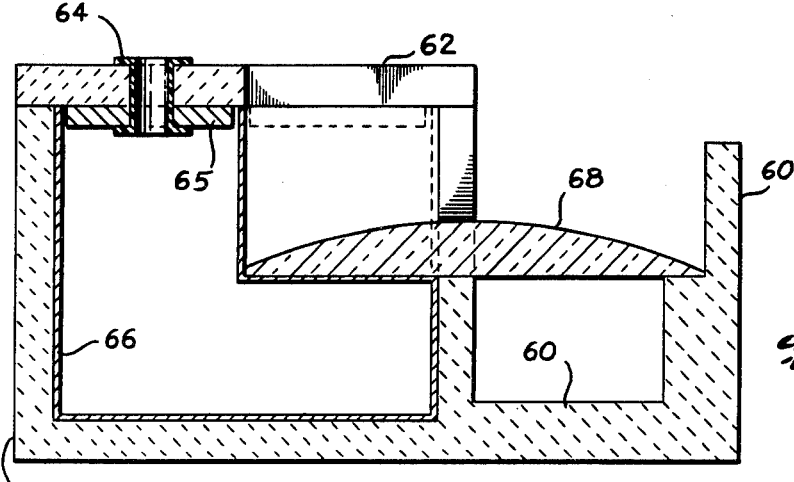
Figure 6C:
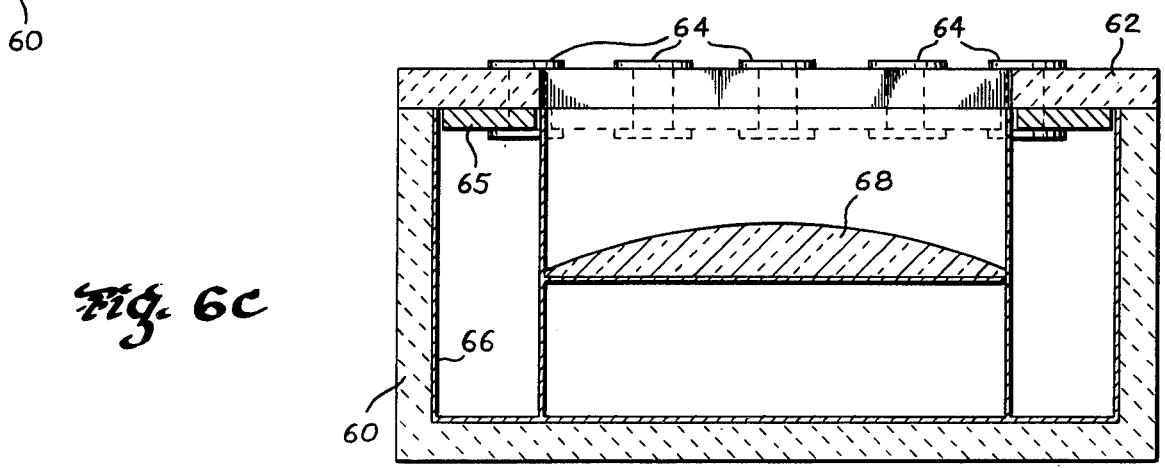
Figure 8:
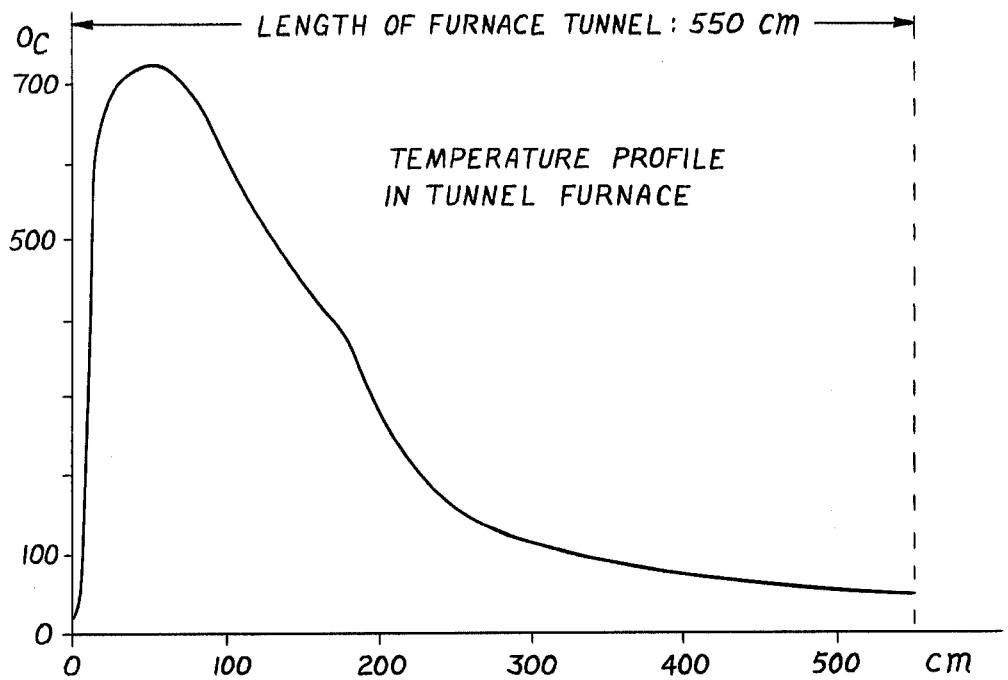
FIG. 8 is a temperature profile of the furnace used in Examples 1, 2 and 3.

100 fixtures of the kind shown in FIGS. 6a through c are prepared and filled with 30 cm distilled water each. Filling is done preferentially through the center hole in the lid of each fixture (FIGS. 6a,b and c). Then a pressing made of potentially photochromic glass is placed on the "brown block" of each of the fixtures so that the concave side of the glass blank rests on the convex side of the "brown block." The convex, upper surface of the block is of spherical shape with a radius of curvature of approximately 88 mm. The dimensions of the rectangularly shaped glass pressing are 60 mm × 56 mm × 10 mm thick, and its concave spherical surface is pressed to a curve of approximately $-6.0$ diopters (in 0.53 units), which corresponds to an approximate radius of curvature of 88.3 mm. The longer edge (60 mm) of said pressing is oriented parallel to the row of vent holes in the lid of the fixture and one of these edges is in contact with the stainless steel wall of the water container, thus leaving a gap of approximately 4 mm between the opposite side of the pressing and the insulating ceramic wall which supports the "brown block" at its edge outside the part of the fixture containing the water. The fixtures are then placed in pairs on the belt of the furnace spaced approximately 5 cm apart. A continuously operating, heat treating furnace similar to the furnaces used in conventional production of fused bifocal blanks is useful in practicing the invention. The chief characteristics of furnace are:

Length of the electrically heated funnel is 550 cm, temperature profile along its length, directly above the belt as shown in FIG. 8, temperature across the belt is essentially constant withing ± cm from the vertical, central plane through the heated tunnel, belt speed is approximately 5 cm/min.

After removal of a fixture from the furnace belt and approximately 15 min. cooling time, the heat treated glass pressing is removed from the fixture, tested and stored for subsequent packaging or for grinding and polishing required to prepare gradated photochromic, one-piece bifocal, ophthalmic prescription lens.

EXAMPLE 2

The equipment is the same as described in example 1 and procedures described in example 1 are employed identically, with the exception that the 60 mm × 56 mm × 10 mm pressing of potentially photochromic glass is now positioned on the "brown block" so that one of the 60 mm long edges is in contact with the insulating ceramic support of the "brown block." Between the opposite 60 mm long edge and the wall of the stainless steel container a distance of approximately 4 mm is maintained. The gradated photochromic bifocal lens, a type thus produced from a blank, exhibits a wider photochromic distant vision portion than the non-photochromic near vision ("reading") portion. Such lenses are usually prescribed in cases where a wide field of clear vision of distant objects is desirable.

EXAMPLE 3

120 fixtures of the kind shown in FIGS. 7a, b, c are used and instead of distilled water of Example 1 which evaporates completely during processing, the salt $Na_2SO_4$ is used as the thermally active heat sink material.

In each of the 120 fixtures the stainless steel insert 78 of each fixture is filled with 220 grams of pulverized $Na_2 SO_4$ and carefully covered again with the lid. In doing so a slight periodic movement of the lid is exercised to ensure penetration of the stainless steel pocket protruding from the lid into the crystal powder and complete fitting of the lid. Each fixture is then preferably placed under an exhaust hood and cleaned on the outside as by blowing a low velocity stream of air at the fixture. Special care is taken to clean the stainless steel pocket intended to support the glass pressing.

The prepared fixtures are then each loaded with a pressing made of potentially photochromic glass so that the convex surface of the pressing faces the concave surface of the stainless steel pocket in the lid of the fixture. The dimensions of the round glass pressing are approximately 70 mm in diameter and 10 mm thick and its concave, spherical surface is pressed to a curve of approximately $-6.5$ diopters which corresponds to an approximate radius of curvature of 81.5 mm. Then the fixtures are placed in pairs on the belt of the furnace described in Example 1. A second pair of fixtures is now prepared in the same manner and placed on the furnace belt behind the first pair in a distance of approximately 2.5 cm. As the fixtures reach the exit port of the furnace and are removed from the belt, as in examples 1 and 2 a gentle stream of air is blown over the fixtures to facilitate cooling. After approximately 15 min. cooling time the heat treated glass pressing is removed from the fixture, tested and stored for either subsequent packaging or for grinding and polishing required to prepare a gradated photochromic single vision ophthalmic prescription lens. The fixture is inspected without removing the lid. Fixtures passing this inspection are placed on a horizontal conveyor belt and transported back to the work station of the entrance port of the furnace.

In practicing the invention a fixture constructed according to the above disclosures is placed in a heat treatment furnace, such as a continuously operating bifocal fusion furnace or, on the conveyor belt of conventional glass annealing lehr. The fixture including the lens to be given the reversible progressive variation in phototrophic behavior is exposed to a spacially uniform temperature field. The temperature field is one conventionally known as adequate to develop phototropic properties as discussed in the prior art above. Fixture 10 and lens L are gradually heated in the furnace according to the illustrated curves so that the temperature and portion L' of the potentially photochromic or phototropic lens exceeds the minimum temperature required to develop phototropism. Accordingly portion L" is exposed to the furnace temperature field, however according to the invention the temperature within the lens portion L" prime does not reach that minimum temperature necessary for the development of phototropism. It should be recognized that existing between portions L' and L" is a region Lv wherein there is a temperature existing in the lens extending from the temperature below that necessary to develop phototropism to the temperature at or above which phototropism may develop in the potentially phototropic lens. It should be recognized that it is within this region that the continuous progressive local variation in phototropic properties is developed. It should be further recognized that due to the thermal inertia of the heat sink material $Na_2SO_4$ or $H_2O$ this non-equilibrium condition will continue before, during and for a certain time after the heat absorbing phase transition is taking place within the ranges characteristic for the selected for heat sink material.

Figure 5:
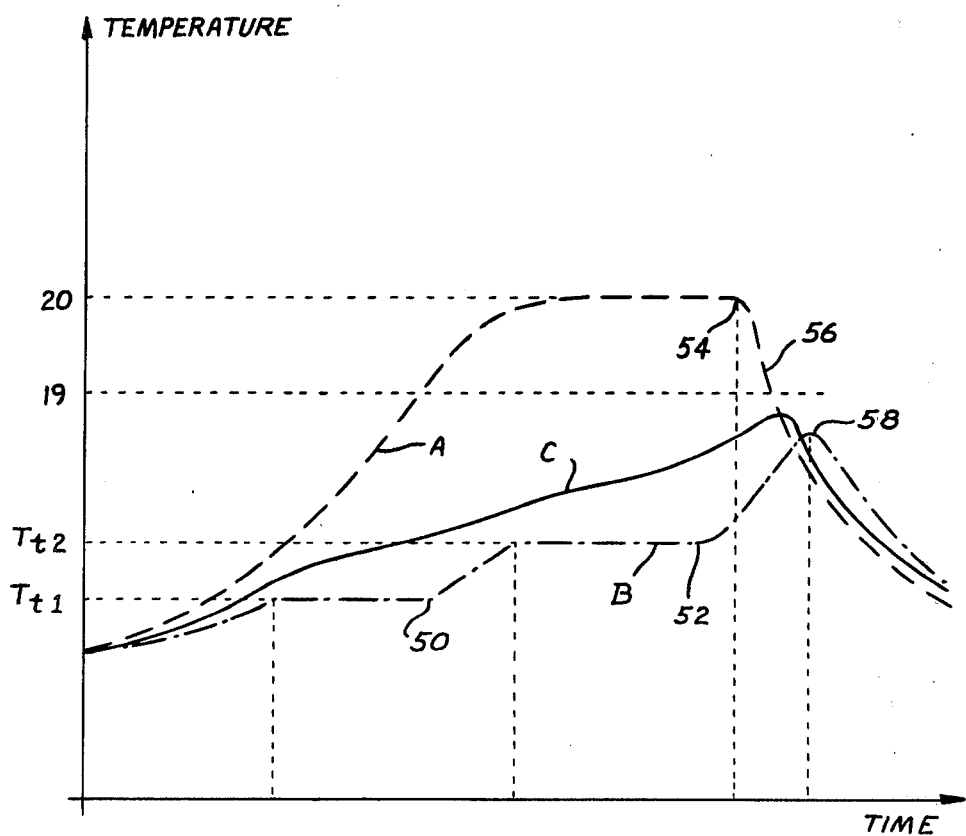
FIG. 5 is a temperature profile of heat treatment temperatures existing in a lens or lens blank, furnace environment and apparatus of FIGS. 1 through 4 during the heat treating cycle of the invention.

Referring now to FIG. 5, the functional relationship between temperature and time as it exists simultaneously in the three different sections of the system is illustrated. Curve A illustrates the temperature in portions L' of the lens or lens blank L depicted or illustrated in FIGS. 1 through 4. Curve B illustrates the temperature in heat sink means 30 in the instance wherein the material exhibiting two heat absorbing phase transitions within the range of temperatures of the heat treatment (example: $Na_2SO_4$). Curve C illustrates the temperature in portions L" of the lens or lens blank L illustrated in FIGS. 1 through 4, and 6 and 7.

For the purposes of discussion, point $T_t$ on the temperature scale indicates the temperature above which phototropism is developed in the potentially photochromic or phototropic glass of lens L. The point $T_h$ on the temperature scale indicates the temperature at which the lens samples may develop light scattering particles of a size large enough to cause haziness in the lens or lens blank L. It should be recognized that full development of phototropism as well as overdevelopment of phototropism to the point of development of light scattering particles, the latter resulting in haze, are functions of both time and temperature.

In FIG. 5 it may be observed that as the entire assembly including fixture 10 and lens L is heated in the furnace, the temperature curve A of lens portion L' follows with some delay the furnace temperature (Curve E). Similarly, the temperature of the heat sink material 30 (Curve B) follows the same general trend, however, with a greater delay than Curve A until the first phase transition temperature is reached (as indicated at point $T_{t1}$). In accordance with the characteristics of materials undergoing phase transitions, heat sink material 30, remains at the phase transition temperature as long as any portion of the material continues to undergo the phase transformation. Thus, curve B flattens to the first phase transition temperature $T_{t1}$.

After completion of the phase transition, which is indicated on the time axis by point 50, the temperature in the heat sink material 30 may again rise according to the heat input from the furnace. It should be noted now, however, that the slope of curve B is again similar to that of curve A, but delayed further with respect to time.

If the selected heat sink material 30 is one of the class which exhibit two phase transitions within the heat treatment range of lens L, a second phase transition may be reached which is indicated at point $T_{t2}$ in FIG. 5. This presents a second temperature plateau and continues as long as the heat sink material 30 undergoes the second phase transformation. Point 52 on the time axis indicates a completion of the second phase transition and again, as previously, the temperature of heat sink material 30 may again rise according to continued heat input from the furnace. A further change in the difference of shapes of curves A and B may again be noted with the rising temperature of the heat sink material, again paralleling the trace of curve A.

At point 54 on the time axis, the entire fixture and lens enter the annealing zone of the heat treatment furnace, the lens portion L' having undergone sufficient heat treatment to develop the desired photochromic properties. The negative slope of curve A as indicated at 56 is indicative for the reduction in furnace temperature. As may be expected assembly 10 begins to lose heat which results in negative slopes of curves B and C. It may be observed that curve B continues to show a momentary rise which is due to the thermal inertia of the assembly fixture/lens blank. When these materials reach temperature equilibrium as indicated at 58, the temperature of the heat sinking material 30 may now decrease, however, again exhibiting approximately parallelism and some delay from the temperature profile in the furnace 10 indicated by curve A.

During the above described heating cycles of the fixture 10 and the heat sinking material 30, the lens portion L" has been exposed to two temperature fields superimposed upon each other. These being temperature field of the furnace indicated by curve A and the temperature field of the heat sinking material indicated by curve B. Curve C indicates the temperature existing inside this lens portion L" and it can be seen to assume the value between curves A and B. Curve C does not exactly follow the steps of curve B due to the thermal inertia of the entire system. The heat absorbed by the heat sink material 30 during the endothermic phase transitions taking place at temperatures $T_{t1}$ and $T_{t2}$ is set free again during the cooling period and result in a smoother annealing curve then imposed by the furnace temperature curve A, provided the transitions are of a reversible nature. Such is the case for the salt $NA_2SO_4$ used in example 3. Examples 1 and 2 utilize water which completely evaporates and escapes from the fixture therefore it does not affect the annealing curve.

The smoothing effect interposed by the thermal barrier of support means 24 provides a smoothing effect upon the vertical component of the temperature gradient as may be seen in the curve. Such smoothing effect is highly desirable in the heat treatment of ophthalmic lenses depending upon the particular lens material. A steep temperature gradient between the two portions L' and L" of the lens may induce a fracture in the material during the heat treatment cycle. In the selection of optimum materials to serve as the heat sinking material 30 the following formula is suggested as a guide:

$$F = Q/T_n$$

where: F=figure of merit;
Q= total energy per unit volume absorbed by the heat sink material within the temperature range from approximately 20° C. to the maximum temperature permissible to avoid development of phototropism;
$T_n$=the highest useable phase transition temperature of the heat sink material.

The figure of merit may be used in describing the degree of the usefulness of the heat sink material 30 according to the present invention. In using this figure of merit, the figure should be a high number for a suitable material (as determined by appropriate temperatures lack of toxicity, radioactivity, etc.) in comparison to the heat treatment temperature necessary for lens L. The materials listed in Table 2 are arranged in a sequence based upon this figure of merit F.

In determining this number the total energy Q absorbable by the material must be calculated. In this calculation it is necessary to consider not only the latent enthalpy of each phase transition, but also the heat capacity of the material as determined by its density and specific heat. Naturally, this must be related to the volume of material which may be fitted within the divided portion 18 of fixture 10. For this reason the Q value in the figure of merit is expressed in terms of energy per unit volume. Q may be estimated according to the formula below in which a reference temperature of 20 degrees C. has been chosen. This figure represents a normal room temperature or starting temperature for the materials. With this assumption:

$$Q = \frac{\rho}{M}\left\{\sum_{i=1}^{n} \int_{Ti-1}^{Ti} c_i\, dT + \int_{Tn}^{Tm} c_n\, dT + \sum_{i=1}^{n} \Delta H_i\right\}$$

=specific gravity of heat sink material 30 at room temperature (20 degrees) measured in g/cm$^3$;
M=molecular weight of heat sing material 30;
n=total number of phase transitions exhibited during the eat treatment cycle in the temperature range 20 to $T_m$ ° C.;
$c_i$=specific heat of phase number i measured in Joules/(mole ° degree C.);
$H_i$=enthalpy of phase transition number i in kilojoules/mole;
$T_i$ will be $T_{t1}$, $T_{t2}$... $T_{tn}$;
$T_o$=20° C.

The present method of heat sinking through phase transformation is preferable to that which might be achieved by utilizing Peltier elements in lieu of heat sink materials 30 exhibiting high endothermic enthalpies of phase transitions. Utilization of the Peltier effect would require electrical connections for each individual fixture. Such connections would inhibit the flexibility of the process (e.g. material handling) during the heat treatment cycle.

Likewise I have considered heat sinking portion of each fixture to an external heat sink. This approach would also limit the flexibility use of the fixtures 10 according to the present invention in that heat conducting connections would be required to be maintained with the fixtures during the heat treatment cycle. This is of particular disadvantage in the case of heat treatment in continuously operating furnaces.

The process and apparatus as described herein also permits simultaneous production of a wide variety of shapes and sizes of gradient photochromic or phototropic lenses or lens blanks in the same furnace. It is additionally possible to produce gradated phototropic or phtochromic lenses or lens blanks even simultaneously with fused multifocal lens blanks, provided the maximum temperature obtainable by the lens L in that cycle is sufficient to develop photochromic properties in a potentially photochromic material. It should be noted that the shape, and heat capacity of fixture 10,10A and heat sink material 30 should be, and readily can be, matched to the particular shape and size of lens or lens blank to be treated.

Having thus described my invention in detail and with sufficient particularity as to enable one skilled in the art to practice the invention, what is desired to be protected by Letters Patent is set forth in the following claims. Likewise, variations and modifications of the invention which do not depart from the spirit and scope of such claims will be evident to those skilled in the art.

What is claimed is:

1. A method of treating opthalmic quality lenses or lens blanks, to produce a reversible, progressive local variation in phototropic behavior, with a continuous variation in transmissivity from a lens or lens blank composed of a potentially phototropic glass containing all the necessary ingredients including uniformly dispersed silver halide therein to develop phototropic behavior during heat treatment which includes the steps of mounting the lens or lens blank in carrier means heating said lens or lens blank in a heat treatment furnace at a temperature sufficient to develop phototropic behavior in the potentially photochromic glass maintaining selected portions of said lens or lens blank at a temperature to substantially inhibit the development of the photochromic behavior and to produce a progressive gradient of transmissivity, wherein the improvement comprises: heat-sinking said selected portion of said lens by using the latent heat of transformation of a heat sink material by selecting a heat sink material having at least one phase transition temperature below the temperature of development of photochromic behavior; placing said material in heat conducting means adjacent to and in thermal contact with said portion of said lens wherein said photochromic behavior development is inhibited to promote heat conduction between said material and said selected portion of said lens or lens blank during a phase transition of said material; exposing said mounted lens or lens blank to the environment of a heat treatment furnace.

2. The method according to claim 1 wherein said heat-sinking material is selected from the group of water, sodium sulfate, sodium hydroxide, tin, zinc, selenium, cadmium, potassium rhenium tetroxide, bismuth, zinc chloride, potassium chromate, silver chloride, tellurium, thallium, cadmium chloride, lead, boroxide, copper bromide, silver bromide, cadmium nitrate, lead bromide, lead chloride, lithium.

3. The method according to claim 1 including disposing heat-sinking material in said lens carrier means.

4. The method according to claim 3 including mounting the selected portion of said lens on conductor means and maintaining said conductor means in conductive contact with said heat-sinking material.

* * * * *